Patented Aug. 9, 1927.

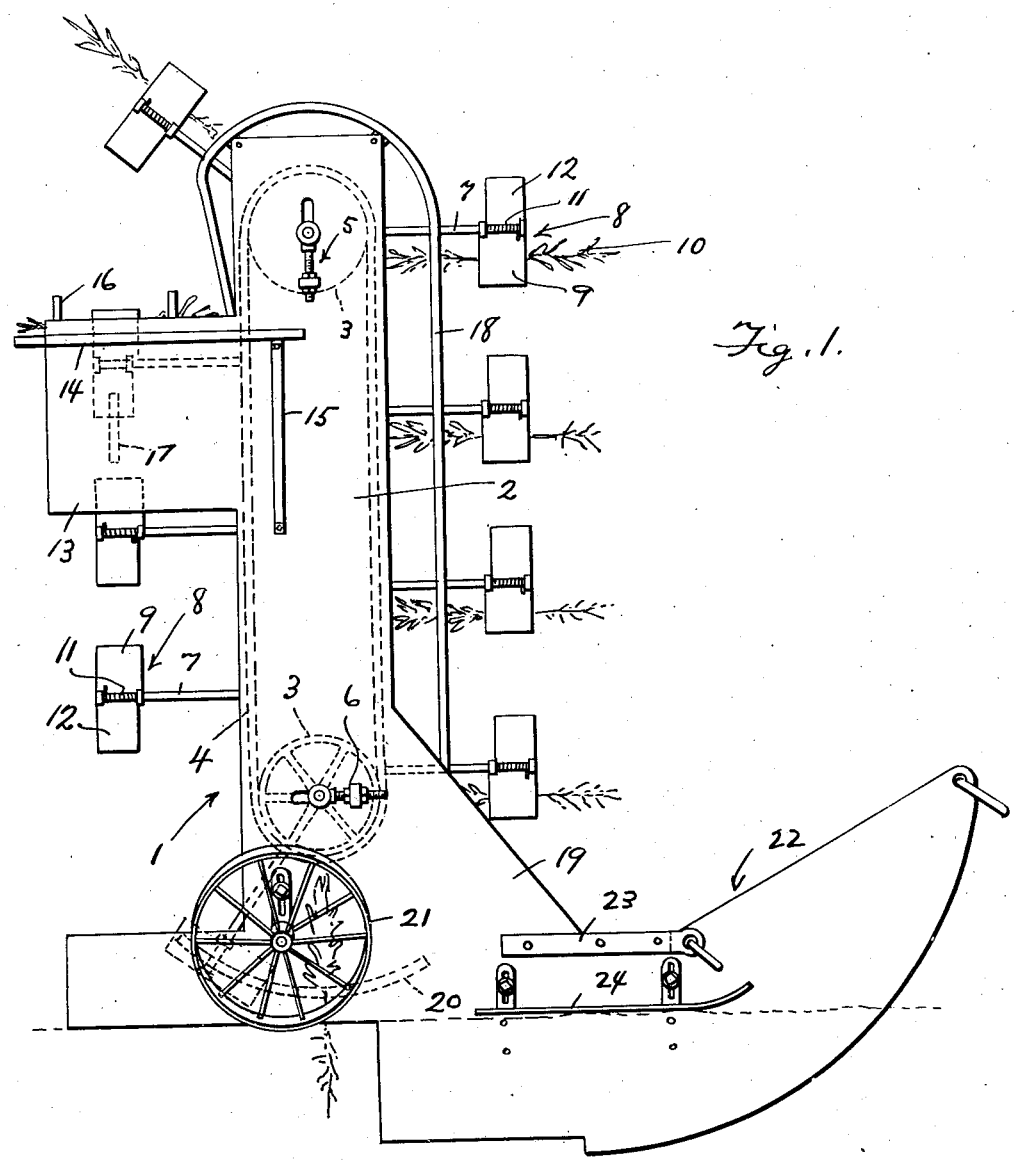

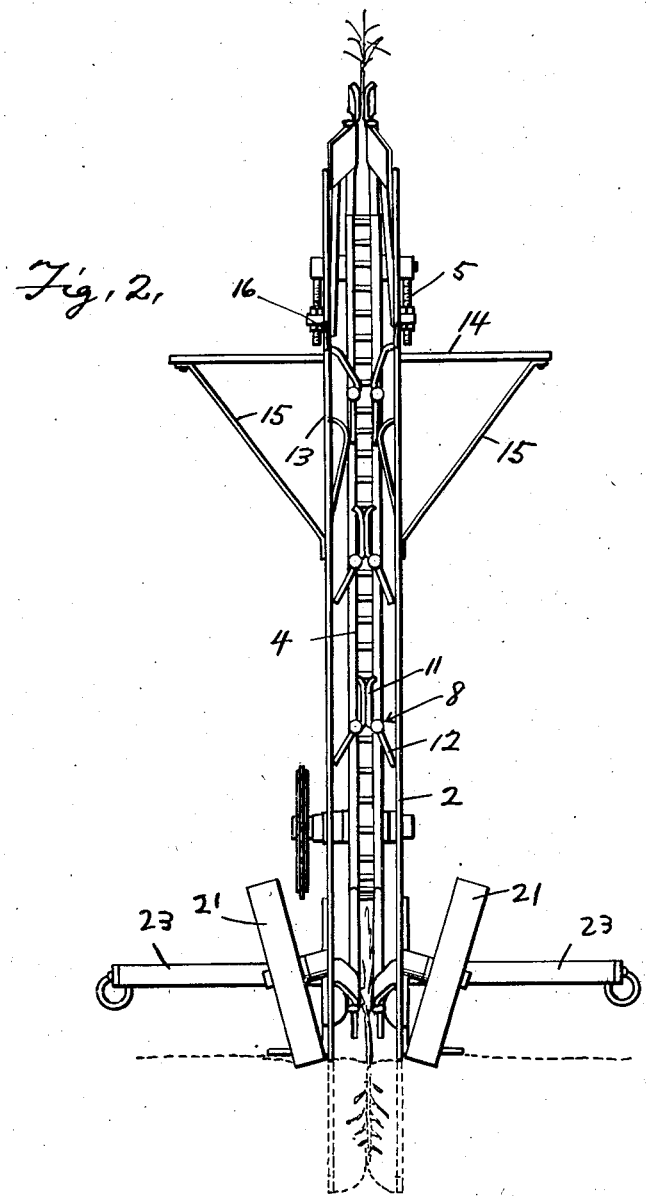

1,638,368

UNITED STATES PATENT OFFICE.

GEORGE A. SHAW, OF SILOAM SPRINGS, ARKANSAS.

PLANT-SETTING MACHINE.

Application filed August 3, 1926. Serial No. 126,870.

This invention relates to an improved agricultural machine, and it has more particular reference to one which is constructed for setting plants of various kinds in a furrow in the ground.

Briefly, the invention has reference to a machine of this class which includes, among other details, an endless carrier provided with a plurality of outwardly extending rigidly mounted arms having plant gripping and releasing devices at their outer ends, and means for actuating said devices at the proper time for first gripping a plant, carrying it upwardly and depositing it at a suitable point.

My principal aim is to generally improve upon structures of this class by providing one which may be mounted upon an appropriate wheel support to be conveyed over the surface to be traversed, the structure embodying comparatively simple details associated in a novel manner for producing a practical and highly efficient structure.

Other features and advantages of the invention will become apparent from the following description and drawings.

In the accompanying drawings:—

Figure 1 is a side view of a machine constructed in accordance with this invention, showing the same in operation, Fig. 2 is a rear elevation of the same, looking in a direction from left to right in Fig. 1.

As before indicated, a suitable supporting structure 1 is provided, and this includes among other parts, a pair of vertically elongated spaced parallel plates 2 between which sprocket wheels 3 are mounted for rotation. Trained over the sprocket wheels is an endless sprocket chain 4. Appropriate adjusting devices 5 and 6 are provided for varying the tension on the chain. Fastened firmly at their inner ends at suitable points to this chain, are outstanding arms 7 at the outer ends of which are the plant engaging and carrying devices 8. Each device embodies a pair of jaws 9 having outwardly flared extremities to facilitate insertion of the plant 10. These jaws are normally held in closed gripping relation by coiled springs 11. In addition there are outwardly diverging tail portions 12 which, when moved together, serve to separate the jaws for releasing the plant.

Extending in spaced parallelism from the rear edge of the plate 2 are outstanding wings 13 with which plant shelves 14 are connected. Each shelf is provided with a brace or prop 15, and is disposed in a horizontal position and at the upper ends of the wings are outwardly directed deflecting fingers 16 to facilitate insertion of the plants, one by one, between the jaws 9.

Disposed on the opposed inner surfaces of the wings 13 are spreaders 17 and it is obvious that when the portions 12 of the devices 8 pass between the spreaders, they move these portions toward each other and in turn separate the jaws 9 to adapt the jaws for reception of a plant. To render the structure more rigid, a guide track 18 is employed and the arms 7 extend through a slot in the track, and this prevents sidewise motion of the arms. The lower portions of the plates 2 are widened as indicated at 19 and these portions straddle the furrow.

Disposed between the portions 19 are opposed longitudinally bowed members 20 which serve to open the jaws in order to set the plant in position for planting. After the plant is set, the adjustably mounted wheels 21 serve to compress or pack the dirt about the plant as shown better in Fig. 2. These wheels are shown in downwardly converging relation to accomplish this packing operation.

The structure also includes a plow 22 of suitable cross section and shape for forming the furrow in order to condition it for reception of the plants. Extending at right angles in a horizontal plane from this plow are outstanding supporting elements 23 with which appropriate supporting wheels or the like (not shown) are connected for supporting the entire machine. Considering Fig. 1 in conjunction with Fig. 2 it will be seen that the members 23 extend outwardly a distance beyond the plow and are provided on their outer ends with metal straps riveted in place and the straps carrying draft hooks or rings. Obviously, this adds in balancing the relatively high structure by connecting in supporting chains (not shown). Then as before intimated wheels may be attached to these parts in any appropriate manner to prevent side tilting.

Just below the elements 23 are runners 24 of suitable construction which are adjustably mounted for gaging and regulating the depth of the furrow. In practice, it is obvious that the plants are piled on the shelf and are placed one by one in between the wings 13 at the proper intervals so that when the endless carrier is in operation, the jaws 9 of the devices 8 will be spread apart for reception of the plants as shown in Fig. 1.

As the device passes on, it grips the plant as shown and travels downwardly and then forwardly between the portions 19 of the plate 2. Here, the device is acted upon by the spreaders 20 and the plant is placed in a vertical upright position in the furrow, which has already been formed by the plow 22.

The wheels 21 serve to pack the loose dirt and to hold it temporarily in place. The watering and final packing process may be accomplished in any suitable manner.

It is believed that by considering the description in connection with the drawings, persons familiar with structures of this class will be able to obtain a clear understanding of the same. Therefore, a more lengthy description is thought unnecessary.

While the preferred embodiment of the invention has been shown and described, it is to be understood that minor changes coming within the field of invention claimed may be resorted to if desired.

Having thus described my invention, what I claim as new is:—

1. In a structure of the class described, a support including a pair of upstanding parallel plates, sprocket wheels mounted between said plates, a chain trained over said sprocket wheels, arms carried by and extending at right angles from said chain, plant-carrying devices mounted on the outer ends of the arms and including spring-closed jaws, wings extending outwardly from the side of said plates, spreaders between the wings cooperable with said spring-closed jaws, additional spreaders between the lower portions of the plates, dirt packing wheels mounted on said lower portions, and a plow formed integral with said plates and located in advance of said wheels.

2. In a structure of the class described, a support including a pair of upstanding parallel plates, sprocket wheels mounted between said plates, a chain trained over said sprocket wheels, arms carried by and extending at right angles from said chain, plant-carrying devices mounted on the outer ends of the arms and including spring-closed jaws, wings extending outwardly from the side of said plates, spreaders between the wings cooperable with said spring-closed jaws, additional spreaders between the lower portions of the plates, dirt packing wheels mounted on said lower portions, and a plow formed integral with said plates and located in advance of said wheels, guides carried by said plates, said arms extending between said guides and said plant-carrying devices being located outwardly beyond said guides, and adjustably mounted depth-regulating members carried by said plow.

In testimony whereof I affix my signature.

GEORGE A. SHAW.